June 22, 1965 S. FELDMAN 3,191,129

STABILIZED SIGNAL GENERATOR

Filed Oct. 19, 1962

INVENTOR.
Stanley Feldman
BY Mueller & Aichele
Attys.

3,191,129
Patented June 22, 1965

3,191,129

STABILIZED SIGNAL GENERATOR

Stanley Feldman, Evanston, Ill., assignor to Motorola, Inc., Chicago, Ill., a corporation of Illinois Filed Oct. 19, 1962, Ser. No. 231,742
6 Claims. (Cl. 332—19)

Figure 1:
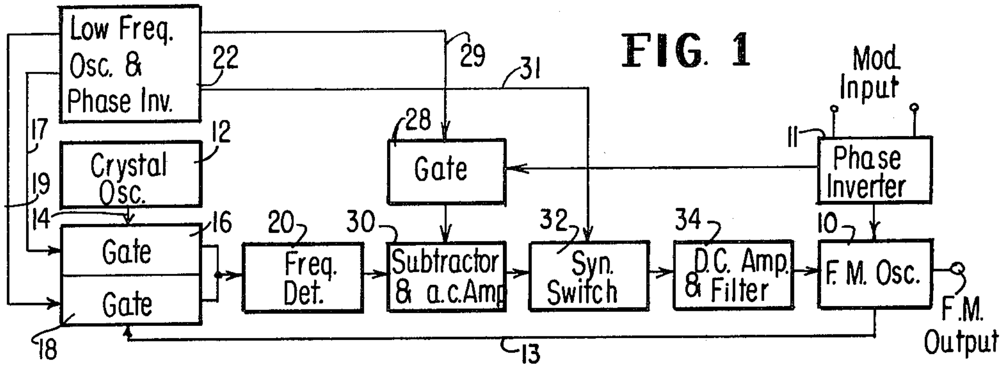
Figure 2:
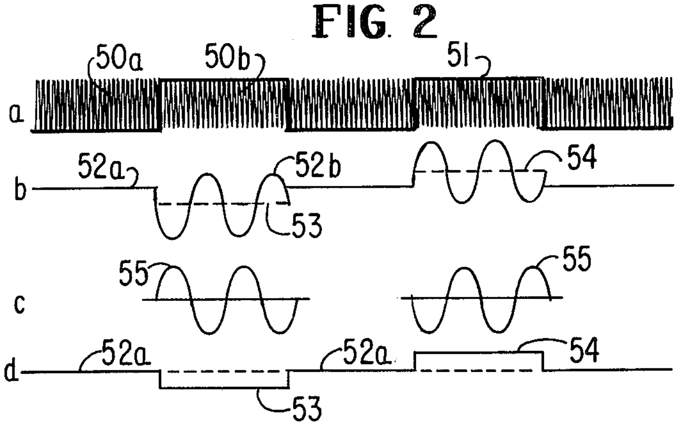

This invention relates to wave generating systems and more particularly to a stabilized frequency modulated signal generator capable of a wide frequency deviation and with a center frequency held to close tolerances.

Systems for automatic frequency control (AFC) of frequency modulated signal sources capable of providing wide frequency deviation and a stable center frequency are usually complex, costly and limited in frequency range and stability. Automatic frequency control loops employing phase detection result in inherent limitations on the frequency deviation of the system without resorting to complicated schemes for frequency division or to techniques utilizing degeneration of the sampled signal which is coupled back to the error sensing discriminator. Systems wherein the modulated wave is sampled and compared with a reference frequency are usually limited in accuracy in that drift in the detected modulating signal introduces an error in the control signal provided by comparing its mean value with the center frequency reference level. As a result, in prior are systems for AFC of frequency modulated signal sources precise control of the center frequency has been achieved only at the expense of placing limitations on the useful frequency deviation of the system.

It is therefore an object of the invention to provide a wave generating system for generating a frequency modulated signal capable of wide frequency deviations and having a center frequency stability approaching that of a stable single frequency oscillator.

A further object of the invention is to provide an improved automatic frequency control system for stabilizing the center frequency of a frequency modulated signal generating system.

Still another object is to provide simple and economical method for producing wide deviation FM signals with an accurately stabilized center frequency.

A feature of the present invention is the provision of a system for producing frequency modulated waves, which system includes means for deriving, on a shared basis, signals indicative of the modulated wave and of a stabilized reference frequency source. A portion of the modulating signal is synchronously sampled with the derived signals and is fed back with a proper phase relationship to cancel variations of the detected modulated signal about a mean value representing the center frequency of the modulated wave. Further means are provided to compare this mean value with a reference level provided by the reference frequency source to produce an error signal for stabilizing the center frequency of the wave generator.

Another feature of the invention is the provision of a method for producing a wide deviation frequency modulated wave having a center frequency accuracy approaching that of a stabilized single frequency oscillator by sampling the frequency modulated waves at a very low rate for comparison with a stabilized reference frequency signal to produce the control signal, by feeding back a properly phased and synchronized portion of the modulating signal to cancel modulation components from the control signal to thereby reduce error inherent in the sampling system, and by coupling the resultant signal to the wave generator to correct for center frequency shifts with respect to the reference frequency signal.

A further feature is the provision of a frequency modulated wave generator having signal responsive means for varying the frequency thereof and gated signal demodulation means such as a frequency discriminator or ratio detector for sampling and comparing the modulated signal with a reference frequency signal provided by a crystal controlled oscillator. A gated feedback circuit, synchronized with the gated demodulation means, couples a properly phased portion of the modulating signal to a signal combining circuit in the output of the demodulation means to cancel modulation components therefrom. The resultant mean value of the sampled modulated wave, when compared with the reference signal derived from the crystal controlled oscillator, produces a control signal which is applied to the signal responsive means of the wave generator for correcting its center frequency.

Still another feature is the provision, in a frequency modulated wave generating system having an automatic frequency control loop of the type wherein detected frequency modulated waves are compared with a detected reference frequency signal for center frequency stabilization, of means to alternately couple the frequency modulated wave and the reference frequency signal on a time shared basis to frequency detection means to thereby provide a control signal, and of means to couple a portion of the modulating signal to the output of the frequency detection means to subtract modulation components from the control signal. A synchronized clamping circuit maintains a reference level for the frequency detector output and the resulting error signal is filtered and coupled to the wave generating means to stabilize the center frequency of the modulated waves.

Figure 3:
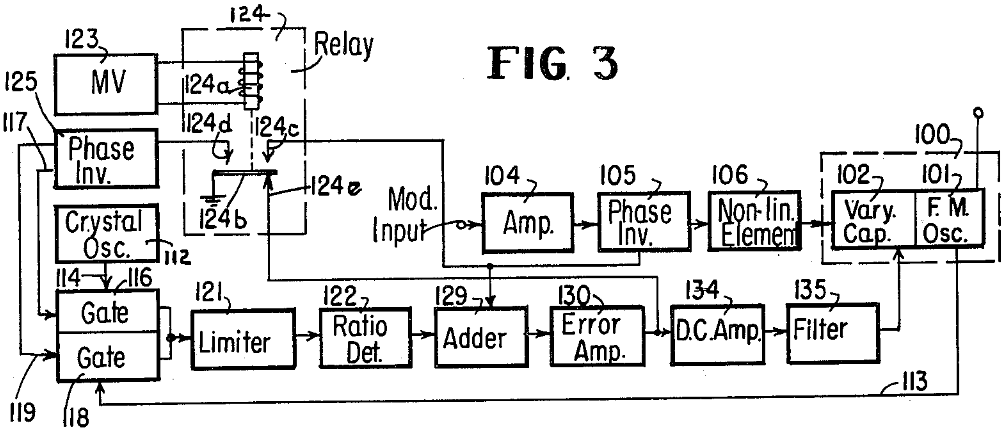

Further objects, features and attending advantages of the invention will become apparent with the following description when considered with the accompanying drawings, in which:

FIG. 1 is a block diagram of a wave generating system embodying the present invention;

FIGS. 2*a*–2*d* illustrate waveforms explanatory of the operation of the invention; and FIG. 3 is a further embodiment in block diagram of the invention.

In practicing the invention there is provided a wave generator such as an oscillator capable of being frequency modulated by a modulating signal applied thereto. A portion of the output of the wave generating oscillator, along with the output of a stabilized reference frequency oscillator, are coupled on a time shared basis by a gating circuit to the input of frequency detection means such as a discriminator or ratio detector. The output of the frequency detector therefore alternately provides a reference signal and a signal representing the modulation applied to the wave generating oscillator, with the mean value of the detected modulated signal being representative of the center frequency of the wave generating oscillator. Sampled portions of the modulating signal applied to the wave generating oscillator are fed back to the output of the frequency detector, properly phased and synchronized with the gating circuit, to cancel or subtract the modulation component of the detected signal so that only the mean value representing the center frequency of the wave generating oscillator remains. This mean value is compared with the time shared reference level signal produced by detection of the output of the reference frequency oscillator to provide an error signal which is subsequently coupled to the wave generating oscillator to thereby correct shifts in its center frequency with respect to the frequency of the reference oscillator. Because of this cancellation of modulation components from the error signal by the feedback arrangement the inherent error in the time shared sampling of the modulated signal and the reference signal is reduced to a negligible amount and the center frequency of the wave generating oscillator is held to substantially the same stability of the reference frequency oscillator.

Referring to the system of FIG. 1, wave generating oscillator 10 of any standard type and including a reactance circuit for frequency modulating the output thereof is operated at a predetermined nominal center frequency. Modulating signals for oscillator 10 are supplied from phase inverter 11. A stabilized crystal controlled oscillator 12 is also operated at this predetermined frequency. The output of oscillators 10 and 12 are coupled to the input of gates 16 and 18 on leads 13 and 14, respectively. Gates 16 and 18 may be conventional vacuum tube or transistor gating circuits which are rendered conductive when an enabling signal is coupled to a control electrode thereof. They function to alternately couple the outputs of oscillators 10 and 12 on a time shared basis to the input of frequency detector 20.

Signals for activating or enabling gates 16 and 18 are obtained from very low frequency oscillator and phase inverter 22. This circuit provides a square wave signal of a first phase on lead 17 to enable gate 16 and a signal of the same repetition rate but 180° out-of-phase on lead 19 to enable gate 18. The output of gates 16 and 18 are coupled to the input of frequency detection circuit 20. This circuit contains limiting in the well-known manner to reduce amplitude variations and further provides an output signal to subtractor and A.C. amplifier circuit 30, which signal is alternately indicative of the modulation supplied to oscillator 10 when gate 18 is activated and indicative of the reference level provided by crystal control oscillator 12 when gate 16 is activated.

A portion of the modulating signal supplied to oscillator 10 from phase inverter 11 is coupled with a 180° phase reversal through gate 28 to the input of subtractor and A.C. amplifier circuit 30. Gate 28 is enabled concurrently with the enabling of gate 18 by a signal on lead 29 in phase with the enabling signal on lead 19 so that the phase reversed modulating signal from inverter 11 is supplied to subtractor and A.C. amplifier circuit 30 only when the output of oscillator 10 is coupled to frequency detector circuit 20. By supplying a 180° phase reversal of the modulating signal from inverter 11 and applying it to a signal combining circuit such as a resistor adder at the input of subtractor and A.C. amplifier circuit 30 cancellation of detected modulation components is achieved. Thus, the resultant output of frequency detector 20 during this interval is only the mean value of the modulated wave supplied by oscillator 10, with modulation components effectively removed therefrom. Because of the time shared inputs supplied to frequency detector 20, there appears at the output of subtractor and A.C. amplifier circuit 30 a square wave signal which alternately represents a reference level provided by crystal oscillator 12 and the mean value of the output of wave generating oscillator 10.

Synchronous switch 32 is activated by a signal on lead 31 concurrently with the activation of gates 16 and 18 to alternately clamp the square wave output of amplifier 30 to a reference potential such as ground reference. This provides a square wave which alternates in magnitude between the mean value of the output of oscillator 10 and the clamped reference, which square wave is coupled to the input of D.C. amplifier and filter circuit 34. Thus, the pulses appearing at the input of amplifier 34 represent an error signal indicative of the mean value of the output of oscillator unit 10, which error signal is periodically compared with a clamped reference. The amplified D.C. pulsations are filtered and supplied as an AFC signal to the reactance element of oscillator 10 to correct its mean or center frequency to that reference frequency provided by crystal controlled oscillator 12.

With particular reference to the waveforms of FIGS. *2a–2d* the operation of the above described system becomes readily apparent. Waveforms 50*a* and 50*b* represent typical high frequency waves coupled through gates 16 and 18, respectively, to the input of frequency detector 20. Because of the gating action these signals are coupled to frequency detector 20 on a time shared basis as indicated by waveform outline 51. It is to be understood that the high frequency wave 50*a* represents the fixed signal frequency output of crystal control oscillator 12 and high frequency wave 50*b* represents the frequency modulated wave supplied by oscillator 10, but for simplicity of illustration these modulations are not emphasized with the waveform therein shown. The detected output of crystal oscillator 12 is a constant level reference signal as represented by the waveform 52*a* while the detected output of oscillator unit 10 is a representation of the modulation signal applied thereto as shown by waveform 52*b*. For simplicity of illustration this is shown as a sinusoidal modulation component, but it is to be understood that other types of modulating signals may also be utilized. It can be seen from FIG. 2*b* that modulation signals 52*b* vary about the center frequency signal of oscillator 10 to provide a mean value represented by dotted lines 53 and 54 respectively. This mean signal will either be above or below reference signal 52*a* depending on whether the center frequency of oscillator 10 is above or below the frequency of crystal controlled oscillator 12.

Modulation component 52*b* is cancelled or substracted from the output of frequency detector 20 by signals 55 (FIG. 2*c*), coupled from inverter 11 with a 180° phase reversal with respect to modulation signals applied to oscillator 10 to subtractor and amplifier circuit 30 at such times as gate 18 is enabled. There remains therefore the error signal represented by the waveform of FIG. 2*d*. Reference signals provided by crystal controlled oscillator 12 are indicated by levels 52*a* and the mean value of the frequency of oscillator 10 is indicated by levels 53 and 54. By coupling this error signal through low pass filter means to the reactance element of oscillator 10, the mean frequency of oscillator 10 is made to correspond with the frequency provided by crystal control oscillator 12.

A particular successful circuit embodiment of the invention is shown in FIG. 3. Oscillator unit 100 includes an oscillator 101 of the conventional type with a voltage dependent capacitance element 102 such as a reverse junction capacitance diode coupled across the tank circuit thereof. Such devices are commonly referred to in the art as varicaps and provide a capacitance which varies inversely with the magnitude of a biasing voltage. Frequency modulation of oscillator unit 100 is achieved by coupling a modulating signal to amplifier 104, phase inverter 105 and non-linear circuit element 106 to control the reactance of element 102. Non-linear circuit 106 is used to compensate for non-linearities in the change of capacitances of reactance element 102 when a voltage is applied thereto and typically may include semiconductor diodes having characteristics selected to be oppositely matched with the non-linearity of reactance element 102.

The output of oscillator unit 100 is coupled on lead 113 to the input of gate 118. The output of crystal control reference oscillator 112 is coupled on lead 114 to the input of gate 116. Gates 116 and 118 receive control signals on leads 117 and 119, respectively, and when activated, couple signals derived from oscillator unit 100 and reference oscillator 112 to the input of limiter 121 on a time shared basis. Gates 116 and 118 may take the form of conventional vacuum tube or transistor circuits which are rendered conductive for the passage of the signals applied to input electrodes for the duration of the signals applied to control electrodes on leads 117 and 119.

Control of gates 116 and 118 on a time shared basis is accomplished by the circuit comprising multivibrator 123, relay 124 and phase inverter 125. Multivibrator 123 is of the free running astable type producing low frequency square wave pulses in the order of 2.5 cycles per second. Relay 124 includes solenoids 124*a*, movable contact arm 124*b*, and fixed contacts 124*c*, 124*d* and 124*e*. Solenoid 124*a* is connected in series with the load resistance of one stage of multivibrator 123 to alternately switch movable contact 124*b* between fixed contacts 124*c*, 124*d* and 124*e*, respectively, at the repetition rate of the output signal of multivibrator 123. Movable contact 124*b* of relay 124 is connected to ground reference potential. Fixed contact 124*d* is synchronously connected to a control electrode of phase inverter 125 to periodically provide a cut-off bias of ground potential. Phase inverter 125 is of the conventional type providing a first output signal in-phase with an input signal applied thereto and a second output signal 180° out-of-phase with the input signal, and these are the signals appearing on leads 117 and 119 to open gates 116 and 118. By way of example, inverter 125 may include a vacuum tube (or transistor) with fixed bias and operating voltages to cause corresponding out-of-phase signals to be developed across anode (collector) and cathode (emitter) load resistances when switched between conduction and non-conduction by movable contact 124*b*. Thus, concurrent with the switching action of multivibrator 123 there is provided two out-of-phase signals having amplitude excursions alternating between ground reference potential and a fixed D.C. level, and when coupled to the control electrodes of gates 116 and 118 provide a time shared input to limiter 121 from the output of oscillator unit 100 and the output of reference oscillator 112.

Limiter 121 removes amplitude variations from the time shared signal representative of the two oscillator outputs and couples this signal to the input of ratio detector 122. Ratio detector 122 is of the well-known type having a center frequency the same as that provided by reference oscillator 112. When gate 116 is activated the output of ratio detector 122 provides a reference signal indicative of the output of reference oscillator 112. When gate 118 is activated the output of ratio detector 122 provides a signal having a D.C. level indicative of the mean center frequency of frequency deviated oscillator unit 100 and superimposed thereon an A.C. signal representing the modulating signal applied to reactance element 102 of oscillator unit 100. The difference between the reference signal and the D.C. signal representing the mean value of the frequency modulated output of oscillator unit 100 provides the error signal for automatic frequency control action.

The output of ratio detector 122 is coupled to the input of a signal combining circuit such as resistance adder 129. A second input to adder 129 is derived from phase inverter 105. It should be noted that this second input to adder 129 is a signal which is 180° out-of-phase with the modulating signal supplied to reactance element 102 of oscillator unit 100. This second input to resistive adder 129 is further connected to fixed contact 124*c* of relay 124 so that the phase inverted modulating signal derived from phase inverter 105 is alternately connected to ground through fixed contact 124*b* concurrent with the switching action of multivibrator 123. Thus, only at such times that gate 118 is activated is there a phase inverted modulating signal applied to the second input of resistive adder 129. Since the detected A.C. signal representing the modulating signal applied to oscillator unit 100 is in-phase with the modulation thereof while the second input to resistive adder 129 derived from inverter 105, is out-of-phase with the modulating signal, these two components effectively cancel so that the resulting output of resistive adder 129 is a D.C. signal having a first level representing the mean or center frequency of oscillator unit 100 and a second level representing the output of reference frequency oscillator 112.

The output of resistive adder circuit 129 is coupled to the input of error amplifier 130. This signal is a square wave having one excursion thereof indicative of the reference level established by crystal oscillator 112 and the other excursion thereof established by the mean frequency value of oscillator unit 100. This amplified error signal is supplied to the input of D.C. amplifier 134. To provide high gain with a minimum of drift, D.C. amplifier 134 is preferably of the stabilized chopper type. The input of D.C. amplifier 134 is also connected to fixed contact 124*e* on relay 124. This provides a synchronous clamping action for the input of D.C. amplifier 134 so that the square wave provided by amplifier 130 may be periodically related to a reference potential such as ground reference provided by moving contact 124*b*. The excursions of the mean value of oscillator unit 100 with respect to this zero reference provides the control signal which is amplified by D.C. amplifier 134 and coupled to variable reactance element 102 for frequency control of oscillator unit 100. To this end the output of D.C. amplifier 134 is filtered by low pass filter 135 to thereby provide a unidirectional control signal having amplitude variations indicative of mean frequency shifts of oscillator unit 100 with respect to the reference frequency provided by crystal control oscillator 112. This unidirectional signal is coupled to voltage variable element 102 of oscillating unit 100 to provide corrective frequency action for the output of oscillator unit 100.

It should be apparent to those skilled in the art that known circuit equivalents may be substituted for individual elements of the above described system. Further, oscillator unit 100 and crystal control oscillator 112 may be designed to have any desired center frequency and they may be ganged for band switching over a wide frequency range. The modulation signal applied to oscillator unit 100 may be of any desired form to convey the desired type of information and may produce unlimited frequency deviation without reducing the accuracy of the AFC system.

The invention provides, therefore, a simple and reliable system for obtaining frequency modulated waves having a center frequency accuracy approaching that of a crystal controlled oscillator. Because of the manner in which frequency stability is obtained no limitations are placed on the amount of frequency deviation which may be utilized with the system. A gated feedback signal derived from the modulating signal removes alternating components from the detected wave to thereby reduce the inherent error introduced in sampling the frequency modulated wave, and a stable reference level is established for comparison of the sampled wave.

I claim:

1. A frequency stabilized signal generating system for producing frequency modulated oscillations including in combination, first oscillator means for generating a wave signal, including, means for supplying a modulating signal thereto, second oscillator means for generating a stable reference frequency, frequency detection means, gating means for respectively coupling signals representative of the output of said first and second oscillator means to said frequency detection means, means for activating said gating means on a time shared basis so that said frequency detection means provides an output signal alternately indicative of the frequency of said first and second oscillator means, signal combining means coupled to the output of said frequency detection means, degenerative feedback circuit means for coupling a portion of said modulating signal to said signal combining means, means for synchronously activating said degenerative feedback circuit means with said gating means to thereby produce cancellation of modulation components appearing in the output of said frequency detection means during intervals that the output of said first oscillator means is detected, means coupled to said signal combining means to provide a control signal indicative of the center frequency shift of said first oscillator means with respect to the frequency of said second oscillator means, and means coupling said control signal to said first oscillator means to correct the center frequency thereof in response to said control signal.

2. A frequency stabilized signal generating system for providing frequency modulated oscillations including in combination, a first oscillator means for generating a wave signal, said first oscillator having means for controlling the center frequency thereof in response to a signal applied thereto, means for supplying a modulating signal to said first oscillator, a second oscillator for generating a stable reference frequency, a frequency detector, first and second gating circuits for respectively coupling signals representative of the outputs of said first and second oscillators to the said frequency detector, means activating said first and second gating circuits on a time shared basis so that said frequency detector provides a signal alternately indicative of the frequency of said first and second oscillators, signal combining means connected to the output of said frequency detector, feedback circuit means including phase inversion means and a third gating circuit for coupling a portion of said modulating signal to said signal combining means, means for synchronously activating said third gating circuit with said first gating circuit to thereby provide cancellation of detected modulation components appearing in said signal combining means, signal amplification means coupled to said signal combining means, means synchronized with said second gating circuit to clamp the output of said signal amplification means to a reference potential, and means for coupling the output of said signal amplification means to the frequency conrtolling means of said first oscillator to control the center frequency thereof.

3. A frequency stabilized signal generating system for producing frequency modulated oscillations including in combination, first oscillator means having means for determining the center frequency thereof in response to a control signal, means for supplying a modulating signal to said first oscillator means, second oscillator means for generating a stable reference frequency, frequency detection means, first gating circuit means for coupling a signal representative of the output of said first oscillator means to said frequency detection means, second gating circuit means for coupling a signal representative of the output of said second oscillator means to said frequency detection means, means for activating said first and second gating circuit means on a time shared basis so that said frequency detection means provides an output signal alternately indicative of the frequency of said first and second oscillator means, signal combining means connected to the output of said frequency detection means, feedback circuit means including phase inversion means and third gating circuit means for coupling a portion of said modulating signal to said signal combining means, means synchronized with said first gating circuit means for periodically enabling said third gating circuit means to thereby provide cancellation of detected modulation components appearing in said signal combining means, signal translating means coupled to said signal combining means, means synchronized with said second gating circuit means to clamp the output of said signal translating means to a reference potential, and means for coupling the output of said signal translating means to the frequency determining means of said first oscillator means to control the center frequency thereof.

4. In a wave generating system having oscillator means with means to control the center frequency thereof and means for supplying frequency modulating signals thereto, the combination including means for providing stable reference frequency oscillations, a frequency detector, first gating means for coupling signals representative of said frequency modulating signals to said frequency detector, second gating means for coupling signals representative of said reference frequency oscillations to said frequency detector, means activating said first and second gating means on a time shared basis so that said frequency detector provides an output signal alternately indicative of said frequency modulating signals and said reference frequency oscillations, signal combining means connected to the output of said frequency detector, feedback circuit means including phase inversion means and third gating means for coupling a portion of said modulating signal to said signal combining means, means synchronously activating said third gating means with said first gating circuit to thereby provide cancellation of detected modulation components appearing in said signal combining means, signal translating means coupled to the said signal combining means, means synchronized with said second gating means to clamp the translated signal to a reference potential, and means coupling the output of said signal translating means to the frequency controlling means of said oscillator means.

5. In a wave generating system having oscillator means with means to control the center frequency thereof, and means for applying a frequency modulating signal thereto, the combination including means for providing stable reference frequency oscillations, frequency detection means, gating means for coupling signals representative of said frequency modulating signal and said reference frequency oscillations to said frequency detection means, means for activating said gating means on a time shared basis so that said frequency detection means provides an output signal alternately indicative of said frequency modulating signal and said reference frequency oscillations, signal combining means connected to the output of said frequency detector, feedback circuit means for coupling a portion of said modulating signal to said signal combining means, means synchronously activating said feedback circuit means with said gating circuit to thereby provide cancellation of detected modulation components appearing in said signal combining means, signal translating means coupled to the output of said signal combining means, means synchronized with said activating means for periodically clamping the translated signal to a reference potential, and means coupling the output of said signal translating means to the frequency control means of said oscillator means to control the center frequency thereof.

6. In a wave generating system having oscillator means with means to control the center frequency thereof, and means for supplying a frequency modulating signal thereto, the combination including means for providing stable reference frequency oscillations, a frequency detector, first gating means for coupling signals representative of said frequency modulating signal to said frequency detector, second gating means for coupling signals representative of said reference frequency oscillations to said frequency detector, means for activating said first and second gating means on a time shared basis so that said frequency detector provides an output signal alternately indicative of said frequency modulating signal and said reference frequency oscillations, signal combining means connected to the output of said frequency detector, feedback circuit means including phase inversion means and third gating means for coupling a portion of said modulating signal to said signal combining means, means synchronously activating said third gating means with said first gating circuit to thereby provide cancellation of detected modulation components appearing in said signal combining means, first signal amplification means coupled to the output of said signal combining means, means synchronized with said gate activating means for clamping the output of said first signal amplification means to a reference potential, and second signal amplification means including filtering means coupling the output of said first signal amplification means to the frequency controlling means of said oscillator means.

References Cited by the Examiner

UNITED STATES PATENTS

| | | | |
|---|---|---|---|
| 2,424,833 | 7/47 | Korman | 331—14 |
| 2,968,769 | 1/61 | Johnson et al. | 331—14 |
| 3,109,148 | 10/63 | Siegal | 331—14 |

ROY LAKE, *Primary Examiner.*